Jan. 15, 1963   J. M. SLATER ETAL   3,073,165
GRAVIMETER
Filed Aug. 12, 1958   3 Sheets-Sheet 1

INVENTORS.
JOHN M. SLATER
WALTER L. PONDROM
BY DOYLE E. WILCOX

ATTORNEY

Jan. 15, 1963   J. M. SLATER ETAL   3,073,165
GRAVIMETER
Filed Aug. 12, 1958   3 Sheets-Sheet 2
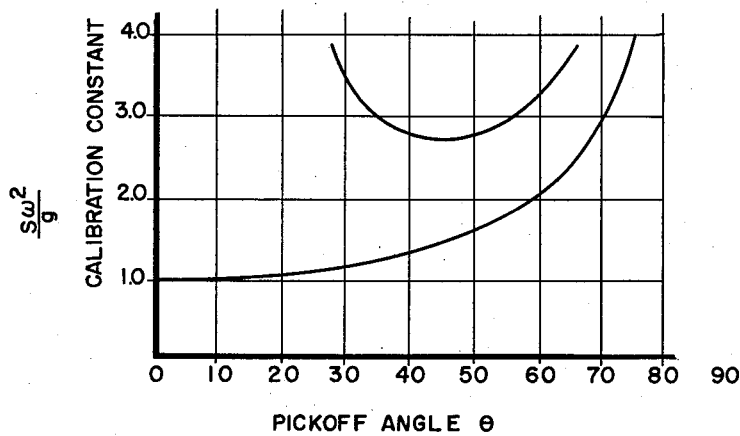
FIG. 3
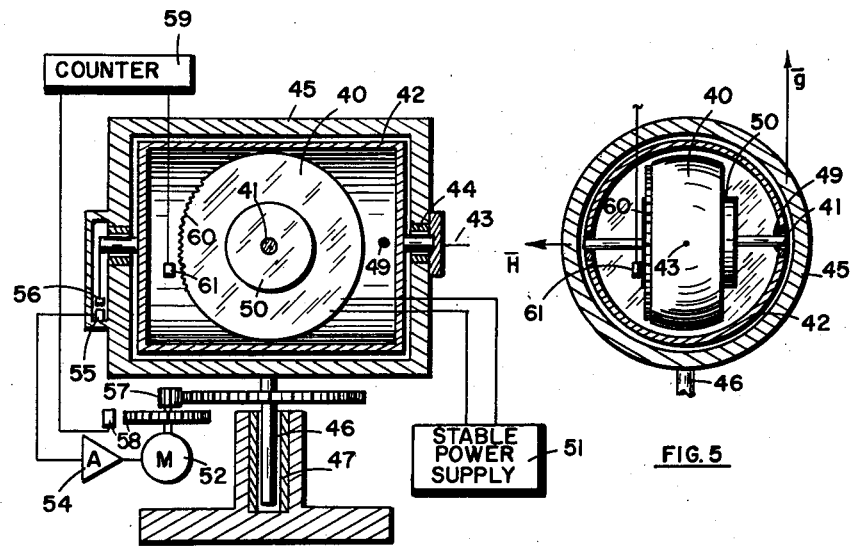
FIG 4
FIG. 5
INVENTORS.
JOHN M. SLATER
WALTER L. PONDROM
BY DOYLE E. WILCOX
ATTORNEY Jan. 15, 1963  J. M. SLATER ETAL  3,073,165
GRAVIMETER Filed Aug. 12, 1958   3 Sheets-Sheet 3

INVENTORS.
JOHN M. SLATER
WALTER L. PONDROM
BY  DOYLE E. WILCOX

ATTORNEY

United States Patent Office 3,073,165
Patented Jan. 15, 1963

3,073,165
GRAVIMETER
John M. Slater, Fullerton, and Doyle E. Wilcox, Puente, Calif., and Walter L. Pondrom, Houston, Tex., assignors to North American Aviation, Inc.
Filed Aug. 12, 1958, Ser. No. 754,663
9 Claims. (Cl. 73—382)

This invention relates to means for measuring accelerations and particularly to an improvement in gravimeters, or devices for measuring the acceleration of gravity, of types which may be used in geophysical prospecting.

The invention is particularly concerned with gravimeters utilizing forces of readily and accurately determinable magnitudes to balance the gravitational forces to be measured. Such forces may be of gyroscopic or centrifugal force origin, for example. More specifically, the invention employs, in one embodiment, means for balancing the force of gravity against the centrifugal force in a conical pendulum. In another embodiment, it utilizes rotation of a gimbal structure to balance forces due to the acceleration of gravity in a gyro-pendulum.

A gravimeter is a sensitive device for measuring the magnitude of the acceleration of gravity, $g$. It is used in geophysical prospecting to detect anomalies or local variations in the magnitude of $g$, which give evidence of the existence and nature of particular subterranean geological structures. For example, in the thick silt beds along the coast of the Gulf of Mexico there exists buried salt domes which are often associated with oil. The domes may give no indication of their presence visible at the surface, yet, due to the difference in density between the salt and silt deposits, a gravitational anomaly may exist which can be detected by sensitive instruments. The value of $g$ may be higher, or lower, than the average over the adjacent areas, depending on the relative densities. The anomalies of interest are extremely small, of the order of 1 part to $10^6$ to 1 part in $10^7$, of the normal value, which at sea level is about 980 centimeters per second per second.

The magnitude of $g$ is a function of the distance R from the center of the earth, which may be expressed in terms of the altitude $h$ above a datum. Variations in measured $g$ which are due merely to variations in R or $h$ must be distinguished from those due to gravitational anomalies. Hence, R must be known to the same proportional accuracy as the intended $g$ measurement. This requires that $h$ be determined with an accuracy of the order of a few feet. In practice $h$ is determined by surveying or by a highly refined technique based on the use of the aneroid barometer.

While extraordinary accuracy is required of the gravimeter so far as resolution and drift are concerned, absolute values of $g$ are of less importance. Typically, a number of observations will be carried out along a line or in an area to develop a profile. Periodically, the gravimeter will be checked against a central station of known $g$ and $h$. Drift between checks is assumed to be linear with time and the field data are corrected accordingly.

The most accurate gravity measuring method hitherto known was based on the pendulum. A pendulum, typically a metal ring hanging on a knife edge, is set to swinging and the period T is measured, to find $g$ from the expression:

$$T = 2\pi \sqrt{\frac{I}{mgr}} \quad (1)$$

which may be rewritten as:

$$g = \frac{4\pi^2 I}{mrT^2} \quad (2)$$

where $mr$ is the pendulous moment and $I$ is moment of inertia. This is an absolute method, the measurement of $g$ being determined by the quantities, mass, length, and time, as distinguished from values of electrical currents, spring compliances and the like.

Pendulums of practical size have periods of the order of a second. Thus the measurement is very time-consuming when variations of the indicated order, 1 part in $10^7$, are concerned. This figure corresponds to a gain or loss of only one swing in 115 days, in a seconds pendulum. Ways have been devised to count parts of a swing, but nothing that is very convenient for field use has been developed. Attempts have been made to produce short-period pendulums: one such effort, for example, utilized a tiny pendulum mounted as a movable electrode in an electronic vacuum tube. Devices using a mass-loaded vibratory reed have also been suggested. In general, however, accuracy goes down with size, since pivot friction and other sources of disturbance cannot be reduced proportionally to the moment of inertia of the pendulum. Accordingly, as a gravity measuring device, the pendulum is ordinarily restricted to central station use.

Gravimeters for field use have been developed which have the form of a spring-supported mass, deflections of the spring being taken as a measure of variations in $g$. Readings may be made very quickly. This is not an absolute instrument, the measurement being dependent upon the elastic properties of the particular spring. However, by proper care in choice of spring materials and in manner of operation, drift can be kept to very low values—of the order of 1 part in $10^6$ per day. As deflections are very small, a high resolution pickoff is required.

The spring-mass gravimeters of types presently in use are of limited utility on bases subject to horizontal accelerations, due to the nature of the suspension. This, in general, takes the form of a helical spring support or a torsion filament support, with little or no lateral restraint. Elaborate and delicate caging mechanisms have been developed, in an attempt to protect the suspension from shock damage without introducing a "set" or bias of the spring.

Both the pendulum and the spring-supported types of gravimeters are primarily adapted for use on fixed bases. Gravity measurements have been made on ships, however, using a pickoff operating between a pair of pendulums rather than between the pendulum and base. The fact that a pendulum is an integrating device may be seen from the equation:

$$N = k \int \sqrt{g} \, dt \quad (3)$$

where N is the number of swings. This helps in nullifying the effect of short-period disturbances due to rolling and pitching, though the nonlinear nature of the output, a quadratic, is a drawback under such conditions.

The gravimeters of the present invention preferably make use of a special kind of hydrodynamic bearing for the support of the proof mass, that is, the physical element which senses $g$. In the art of inertial guidance, the problem existed of providing supports for the gimbals of gyroscopes, accelerometers and the like which would be capable of withstanding substantial loads in any direction, yet would be characterized by extremely low friction, and free from other sources of disturbing torques. Pressure-fed journal bearings of liquid and gas types, for example, were developed for such usages, and have the required properties to a high degree. Uncertainty torque is extremely low, load-carrying capacity is high, and the size is small. This type of bearing defines an axis accurately, and so assists in making feasible force-balancing arrangements such as those described herein. Successful operation of such devices would be very difficult to achieve using torsion-wire or other supports which do not fix an axis of rotation accurately. Bearings of the necessary characteristics were described in the pending application of John M. Slater et al., filed September 1, 1954, Serial No. 453,566, for a "Gas Bearing Gyroscope" and that of Joseph F. Acterman, Serial No. 607,220, filed August 30, 1956, and now abandoned, for an "Autolubricated Gas Thrust Bearing," both having a common assignee with the instant application.

The gravimeters to be described hereafter are all of the integrating type. As mentioned above, various specific embodiments have been shown, which will be referred to generally as of the conical pendulum and the gyro pendulum types.

The structure of the present invention, in which forces due to readily measurable accelerations are balanced against that of gravity, has for its primary object the improvement of the construction, and the practicability for field use, of gravimeters.

It is therefore an object of the present invention to provide a gravimeter of an integrating type arranged to permit an accurate measurement in a relatively short length of time.

It is another object to provide an instrument in which $g$ is measured by counting a periodic output signal of relatively high frequency.

It is still another object to provide an integrating type gravimeter in a form useful on a moving base.

Yet another object is to provide a gravimeter in a form resistant to shock damage in transportation.

It is a still further object to provide a gravimeter in which the proof mass is supported in such manner as to withstand substantial accelerations, in addition to $g$, in any direction.

It is a further object to provide a gravimeter in a form in which the magnitude of $g$ can be determined accurately without requiring careful leveling of the unit.

Further objects of this invention with the accompanying drawings, in which:

FIG. 3 is a graph showing the relation between the calibration constant and the displacement angle for the embodiments of FIGS. 1 and 2;

FIG. 4 is a schematic sectional side view showing details of the mounting and measuring equipment associated with an alternative embodiment of the invention, of the gyro pendulum type;

FIG. 5 is an end view of the embodiment shown in FIG. 4; and

In the drawings like numerals refer to like parts.

Figure 1:
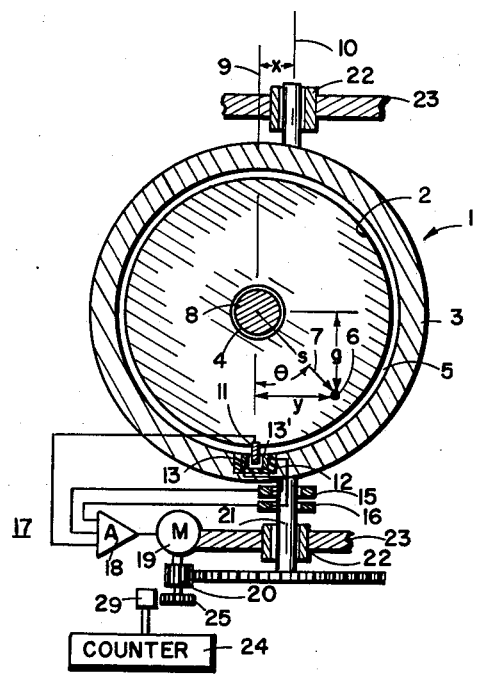
FIG. 1 is a schematic sectional view of a preferred embodiment of a gravimeter of the conical pendulum type employing centrifugal force to balance the gravitational force on a pendulous mass, and having the pivotal axis of the pendulum displaced from the axis of rotation of its housing.

The first embodiment of the invention, indicated generally at 1 in FIG. 1, balances the force of gravity against the centrifugal force in a conical pendulum. It utilizes as the pendulous element a cylindrical member 2 having an axis of rotation normal to the spin axis of its case or housing, and its center of mass eccentrically disposed. Member 2 is rotatably supported centrally within a case 3 by a hydrodynamic or equivalent low friction bearing 4, such as one of the types disclosed in the pending applications of Slater et al. or Acterman, referred to supra. The space between case 3 and member 2 may be filled with a liquid 5. The case 3 should be accurately leveled before the device is used, unless a pair of pendulous elements, geared or linked as in a Watts centrifugal governor, were used.

The center of mass of cylindrical member 2, indicated schematically as being eccentrically concentrated at 6, is displaced along a line 7, the radial length of which may be designated as S, from the axis of rotation 8 of the low friction bearing 4. Line 7 defines, together with a vertical axis of symmetry, diametral line 9, extending through the axis of rotation 8 parallel to the spin axis 10 of case 3, the displacement angle $\theta$ of the center of mass 6. The displacement distance between diametral line 9 and the axis 10 is indicated as $x$ in FIG. 1. The gravimeter scale factor for this arrangement is given by the equation:

$$\frac{\omega^2}{g} = \frac{\tan \theta}{S \sin \theta - x} \qquad (4)$$

wherein $\omega$ is the velocity of rotation about axis 10.

It will be apparent that the eccentrically concentrated mass 6 would tend to hang vertically downward from the pivotal axis along line 9 if there were no rotation of the case 3. If, however, case 3 were to be rotated about either line 9 or the spin axis 10, centrifugal force would tend to cause the concentrated mass 6 to move away from the axis of rotation, with the entire member 2 pivoting about bearing 4. The rate of rotation of the case, and the value of the angle $\theta$ at which a stable position is attained, would be directly related to the acceleration of gravity $g$. At that point, the force due to gravity would be balanced against the centrifugal force exerted by eccentric mass 6 as it rotates about the chosen spin axis.

An exact measure of gravity may be obtained by this method, since the centrifugal force and centripetal acceleration vary as the square of the angular velocity, and therefore the angular velocity at which the device becomes stable varies as the square root of $g$. The magnitude of $g$ may thus be found in terms of basic force and time units, and may be conveniently determined by recording the number of case revolutions over a known length of time on a suitable counter. S will then represent the vector needed to close a force triangle of which the other two legs are the vectors representing the centrifugal force and the force of gravity. Since the anticipated variations in $g$ are small, the positional range of the member 2 may be expected to lie within relatively narrow limits.

For reasons which will be discussed below in connection with FIG. 1 and the graphic showing of FIG. 3, in this embodiment of the instant invention, the range for $\theta$ is conveniently held within a narrow range around 45°, and the center of mass 6 is held on the side of the spin axis opposite to that normally to be expected. This is accomplished by means of a limit stop 11 projecting from member 2 and engaging within a limit stop receiving portion 12 disposed in case 3. The $\theta$ range permitted by limit stop receiving portion 12 is accurately defined by a forward stop plate 13 and a rear stop plate 13', which are electrically insulated from member 2 and from each other. Limit stop 11, projecting from member 2, is likewise a conducting member providing pickoff information, with appropriate external connections. These stop plates are provided with external connections, through means such as forward and rear slip rings 15 and 16, respectively, to a null-seeking servo loop generally indicated as 17. The servo loop 17 includes an amplifier 18 connected between the electrically conducting limit stop 11 and the forward or rear stop plate, 13 or 13', alternatively, as the member 2 pivots to one end or the other of its range. Engagement with either of these plates will initiate a signal through amplifier 18 to control servomotor 19 in the proper sense. The proper sense is that direction in which the limit stop will be returned to a position intermediate the stop plates, and as close as possible to the optimum value for $\theta$.

The correction is accomplished by varying the speed of rotation of motor 19, which drives the case 3 through gears 20 and shaft 21. The shaft 21 is carried in antifriction bearings 22 mounted in a supporting frame 23. The total number of revolutions of the case 3 is recorded by conventional means such as the counter 24, which receives pulses from a toothed wheel 25 and pickup unit 29, and correlated with a precise time standard, not shown, to obtain the local value of $g$.

The displacement $x$ between the vertical line of symmetry 9 and the spin axis 10 is utilized to minimize the sensitivity requirement for the pickoff. If the spin axis 10 were in alinement with the pivot axis 8, as shown in the elementary embodiment of FIG. 2, any error due to pickoff drift or the like would appear as an uncompensated change in the calibration constant of the device, which is related to the displacement distance $y$ between the center of mass 6 and the spin axis 10. In this embodiment, the deflection sensing member 26 operates in conjunction with spaced pickoff elements 27 and 28 to feed signals into amplifier 13 of the null-seeking servo loop 17. This form is subject to increasing error at larger deflection angles, as shown in the graph in FIG. 3. The departure is the cumulative result of $y$ and $\theta$ errors.

Figure 2:
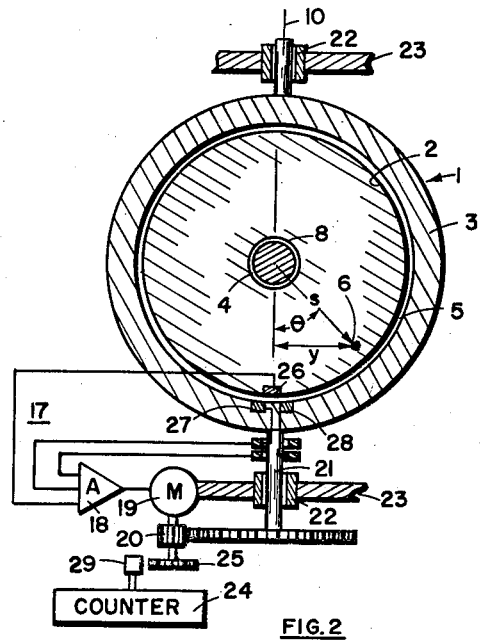
FIG. 2 is a schematic view of an elementary form of gravimeter of the conical pendulum type, in which the pivotal axis of the pendulous mass intersects the axis of rotation of its housing.

It has been found, however, in accordance with this invention, that by displacing pivot axis 8 from spin axis 10 in a direction opposite to the direction of displacement of the center of mass 6 normally to be anticipated with the device shown in FIG. 2 when the case is rotated about the spin axis, any pickoff drift will result in compensating errors in $y$ and $\theta$. The optimum condition occurs at values closely approximated when:

$$\theta = \sin^{-1} \sqrt[3]{\frac{x}{S}} \qquad (5)$$

or $$x = S \sin^3 \theta \qquad (6)$$

Equations 4 and 5 indicate that the optimum value for $\theta$ for this condition is about 45°, when the corresponding value of $x$ is $$\frac{S}{3}$$

Other values for the quantity $$\frac{x}{S}$$

would show similar optimum angle $\theta$ values.

FIG. 3 illustrates graphically the relations between the angle $\theta$ and the calibration constant, or relative scale factor, as defined in Equation 4 for the embodiments of FIGS. 1 and 2, and shows the effect of the compensating $y$ and $\theta$ errors mentioned above for the former. The flatness of the curve for the embodiment of FIG. 1 between values of 44° and 46° for $\theta$ makes apparent the advantage of this invention over the arrangement of FIG. 2, since in the latter the calibration constant has no relatively constant value range, and increases rapidly as the values of $\theta$ become larger. In order to achieve the optimum condition, it is preferred to use the embodiment of FIG. 1, with the range around 45° for $\theta$ values predetermined by the limit stop arrangement. The latter also prevents the member 2 from beginning operation in the cumulative error mode of the embodiment of FIG. 2 on resumption of rotation of the case 3 after it has once been stopped.

An alternative mode of operation for the embodiment of FIG. 1 is also possible, since small variations in $g$ are of interest rather than the total value. In this mode, not illustrated, case 3 could be rotated at constant speed to produce a pickoff null at some standard value of $g$. The pickoff could then control a motor coupled into the rotating system by means of a differential, in a fashion similar to that of FIG. 6.

Figure 6:
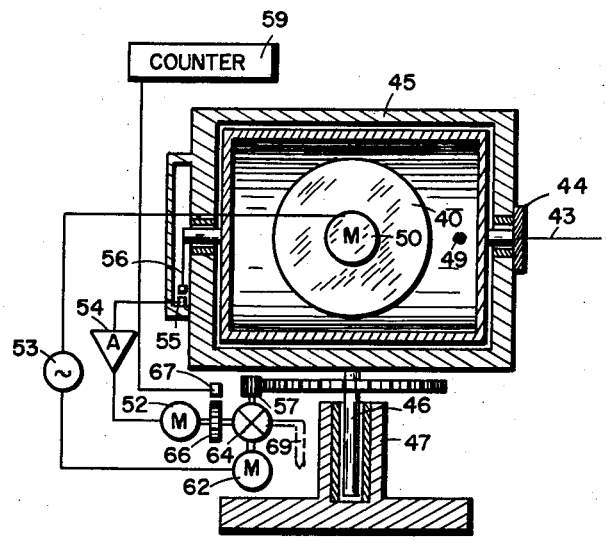
FIG. 6 is a schematic view of a modification of the embodiment of the invention shown in FIGS. 4 and 5.

Another embodiment of the principles of the invention utilizes a gyro pendulum integrating arrangement, details of which are illustrated in FIGS. 4, 5 and 6 of the drawings. Here the force of gravity acting on a displaced gyro-pendulum is balanced by rotation of the gimbal structure. The rotor 40 is mounted on rotor spin bearings 41 of the auto-lubricated gas types referred to in the applications identified supra, for example. Spin bearings 41 are mounted, in turn, in a cylindrical float 42 supported about an axis 43 by hydrodynamic bearings 44 secured in a gimbal member 45. The gimbal 45 is itself mounted for rotation about a vertical axis 46 by equivalent antifriction bearings 47. The float 42 carries an off-axis mass, represented schematically as concentrated at 49, to give a moment $mgr$ about the axis 43 defined by the bearings 44. The rotor 40 is driven by a synchronous motor 50 of conventional design formed integrally with or secured to the rotor, and energized by a power supply 51 of great frequency stability, such as a crystal-controlled oscillator. A servomotor 52, controlled through an amplifier 54 from an output-axis pickoff 55 fixed relative to the gimbal 45 and cooperating with a sensing element 56 fixed relative to the float 42 drives the gimbal through gearing 57 in the proper sense to keep the pickoff signal null. Gearing 57 also delivers information to counter 59 as to the rate of rotation of the gimbal 45 through sensing and pickoff members 58. Rotor 40 carries a toothed wheel signal generator 60, cooperating with a pickup unit 61 to deliver information to the counter 59 as to the rate of rotation of the rotor.

The torque on the gyro is $L = mgr$, where $m$ is the mass, $r$ the radius and $g$ the acceleration of gravity. The precession rate about the vertical gimbal axis is $$\omega = \frac{L}{H}$$

where $H$ is gyro angular momentum, or rotor moment of inertia times spin angular velocity, whence:

$$\omega = \frac{mgr}{H} \qquad (7)$$

This expression in dimensional form is:

$$[t^{-1}] = [m][lt^{-2}][l][m^{-1}l^{-2}t^1] \qquad (8)$$

The device is thus theoretically an absolute instrument, the only quantities entering into the measurement being mass, length and time. In practice, it would be difficult to predetermine rotor moment of inertia as exactly as the other quantities, and accordingly the device would be calibrated at a station of known $g$. The gyro-pendulum gravimeter superficially resembles an ordinary gyro-pendulum integrating accelerometer, as used in some inertial navigators. There are some important practical differences, however. For example, the gyro angular momentum must be determined to about 1 part in $10^6$ on the average. Assuming a nominal rotor speed of 200 r.p.s. and an observation time of 100 sec., the number of revolutions in this period of time must be known to ±0.02 revolution. To determine the number of revolutions accurately, the toothed wheel 60 which has a large number of teeth, say 50 or 100, cooperates with the pick-up unit 61 to act as a signal generator arranged to produce signals that can be fed to the counter 59. Counting 20,000 pulses per second is possible with modern techniques. If a larger number of pulses per revolution is desired, instead of the toothed wheel, a magnetic drum could be used with a magnetic pattern giving, say, 300 pulses per inch.

The gyro revolution counter must similarly resolve to 1 part in $10^6$. The servomotor gear ratio will be made such that the motor turns at, say, 200 r.p.s. at $g = 980.000$, and will have a similar toothed wheel signal generator. Then the difference in number of counts during the fixed observation time will be a measure of the local variation in $g$ from this value, provided a correction is made for any deviation in total number of gyro rotor revolutions $N$ from the values 20,000±0.02. If $N$ comes out less than this value, for example, this means that $H$ was low on the average, and accordingly $N^1$, the number of servomotor revolutions, will be high.

A modification of the embodiment of FIGS. 4 and 5 is illustrated in FIG. 6. Here advantage is taken of the fact that only small differences in g are to be measured, rather than the total value of g. The gyro rotor 40 and the gimbal 45 are driven by identical constant speed synchronous motors 50 and 62, respectively, driven from a common A.-C. source 53. The various constants are chosen so that at a standard value of g the output axis pickoff signal from pickoff 55 and sensing element 56 through amplifier 54 is zero. Departures from this value give rise to a signal from amplifier 54, which controls the servomotor 52. In this case, the servomotor 52 is coupled into the gimbal drive by a differential 64 disposed between constant speed motor 62 and gearing 57. Thus, the speed of the servomotor 52 is a measure of differential g, which may be read from counter 59 by means such as toothed wheel 66 and pickup 67. Assuming constancy of the speeds of synchronous motor 62, this scheme avoids the need for high-speed counting. The embodiment of FIG. 6 requires that the instruments be leveled accurately, and is hence primarily suited to fixed station use.

In either form of the gyro-pendulum instrument, constants might typically be adjusted so that the gimbal 45 turns at something like 0.1 radian per second at 1 g. The vertical component of earth rotation angular velocity has a magnitude of about $7 \times 10^{-5} \sin \lambda$ radians per second where $\lambda$ is latitude, and this must be subtracted from the gimbal rotation rate. The simplest way to do it is to rotate the base upon which the gimbal is mounted. The correction is not an especially critical one. In the embodiment of FIG. 6, the earth rate correction could be introduced at the differential 64 through means indicated schematically at 69. Attention is invited to the application filed June 6, 1958, Serial No. 740,329 by Eugene E. Pentecost, Mark E. Campbell and George F. O'Brien, now Patent No. 2,972,195, on a "Gyro Compass" in this connection.

A typical gyro-pendulum gravimeter for an accuracy requirement of 1 part in $10^6$ might have the following specifications:

Angular momentum:
$H = 10^6$ gm.-cm.$^2$-rad.-sec.$^{-1}$

Mass-unbalance moment:
$L_g = mgr = 10^5$ dyne-cm. $= 100$ gm.-cm.

Angular velocity of precession about input axis at 1 g:

$$W_x = \frac{L}{H} = 0.1 \text{ rad. per sec.} = 0.1/2\pi \text{ r.p.s.}$$

Allowable disturbing torque:
$L_d = 10^{-6} L_g = 0.1$ dyne-cm.

Gyro drift rate for this disturbing torque:
$W_d = 10^{-6} W_g = 10^{-7}$ rad./sec. $= 0.02$ deg./hr.

It will be noted that while requirements on the instrument are high, they are not excessively out of line with what is well within the skill of the instrument arts.

Since the embodiments illustrated and described utilize anti-friction bearings such as those of the liquid type, in which the support element must be submerged in the liquid, there are certain sources of disturbing torques or forces. Among these are convection currents, generated if one side of the case is hotter than the other; torques associated with flow patterns of liquid exhausted from the bearing; gravity moments due to mismatch of center of buoyancy and center of support. There are also other sources of disturbing torques, present whether the device is liquid-floated or not, for example, spring coercion from lead-in wires or pickoff, coupling of the earth's field or other magnetic fields with the sensitive element, mass shifts due to creep of metals, and the like.

Although the invention has been described and illustrated in detail, it is to be clearly understood that the same is by way of illustration and example only and is not to be taken by way of limitation, the spirit and scope of this invention being limited only by the terms of the appended claims.

We claim:
1. An integrating gravimeter of the gyro-pendulum type for measuring the acceleration of gravity, comprising a proof mass, comprising a gyroscope having a rotor and motor means for driving said rotor, a first gimbal means mounting said rotor and motor means, and said gimbal comprising low friction bearing means arranged to support said gimbal for rotation about an axis normal to that of said rotor and in a substantially horizontal plane, said proof mass having its center of mass located in a position to produce a force tending to rotate said mass in said low friction bearing means, a second gimbal means for supporting said proof mass and said low friction bearing means, means for rotating said second gimbal means about a vertical axis, pickoff means for detecting deflection of said proof mass about the axis of said low friction bearing means, servo means responsive to said pickoff means and comprising means for rotating said proof mass in said second gimbal means about said vertical axis in such a direction as to restore said proof mass to null position, said means for rotating having a differential receiving on a first input side the output of said servo means, said differential being also adapted to receive the output of motor means operating at a rate of speed directly proportional to that of said motor means for driving said gyro rotor, and output counting means disposed to indicate the angular rotation of said first input to said differential.

2. In a device substantially described in claim 1, means associated with said differential for introducing an additional component to correct for variations due to the earth rotation angular velocity.

3. In an integrating gravimeter of the gyro pendulum type for measuring the acceleration of gravity, the combination of, a supporting base fixed in a substantially horizontal plane relative to the earth, shaft means mounted on said base for rotation about a vertical axis, a gimbal member fixed to and rotatable with said shaft means, a proof mass comprising a float member supported within said gimbal member by hydrodynamic bearing means having a rotational axis normal to said vertical axis, and having the center of mass of said member eccentrically disposed from said rotational axis, a gyroscopic rotor disposed within said float member for rotation about an axis normal to said rotational axis and said vertical axis, first motor means for turning said rotor at a constant rotational velocity, second motor means, having a rotational velocity proportional to that of said first motor means, for causing rotation of said gimbal about said vertical axis, said second motor means arranged to effect such rotation of said gimbal through a differential and in such a direction as to aid in maintaining said float member at an undeflected position, means for providing to said differential a first additional input representing the deflection of said float member from a particular position of the center of mass thereof, and means for driving one input of said differential in accordance with the angular velocity of the earth about the local vertical axis, and means for summing the rotations of said gimbal in response to said first additional input to said differential.

4. In an integrating gravimeter of the gyro pendulum type for measuring the acceleration of gravity, the combination of: a base having a bearing therein for supporting a shaft member about a vertical rotational axis, a shaft member adapted to be rotatably mounted in said bearing and to support a gimbal member thereon for rotation about said vertical axis, hydrodynamic bearing means providing an axis of rotation normal to that of said shaft member disposed in said gimbal member, a float member rotatably mounted in said hydrodynamic bearing means and having a gyro rotor mounted therein for rotation about an axis normal both to the rotational axis of said float and the axis of rotation of a shaft member, said float member having its center of mass disposed spaced apart from the rotational axis of said hydrodynamic bearing means, and motor means for driving said gyro rotor, means for sensing the angular departure of said float member from a null position, and servo means adapted to rotate said gimbal in a direction to oppose such departure, said servo means comprising a plurality of motor means, one of which is responsive to said means for sensing, and said servo means further including a differential means; said differential means receiving as inputs from one of said motor means a rotation proportional to that imparted to said gyro rotor, and a rotation proportional to the earth's angular velocity about the local vertical, and from the one of said motor means responsive to said means for sensing said latter motion means providing rotation to said gimbal to aid in restoring said float member to null position; and output counting means driven by the one of said differential input means controlled by said sensing means.

5. In an integrating gravimeter of the gyro-pendulum type; a pendulous element comprising a mass $m$ of radius $r$ subject to a component of gravity $g$ so as to produce a pendulous moment $L=mgr$; support means for supporting said pendulous element, said support means being rotatable about a vertical axis; said pendulous element further comprising a gyroscopic element having an angular moment $H$; servo rotational means for rotating said support means and pendulous element about said vertical axis at an angular velocity $\omega$ for generating a gyroscopic moment $L=\omega H$; pickoff means for detecting deflection of the pendulous element from a null position; said servo means being responsive to said pickoff means for controlling said gyroscopic moment for maintaining said pendulous element at a null position, and means responsive to said servo means for integrating with respect to time rotations of said supporting means as an indication of acceleration due to gravity.

6. A gravimeter comprising a support, an unbalanced mass, bearing means mounting the mass to the support for pivotal motion about a first horizontal axis, said mass including a rotor mounted for rotation about a second horizontal axis substantially normal to said first horizontal axis, means for rotatably driving said rotor about said second horizontal axis, variable speed driving means for effecting rotation of the support about a vertical axis, pickoff means for sensing pivotal deflection of the mass about said horizontal axis, control means responsive to said pickoff means for operating said driving means to decrease the sensed deflection, and means for measuring the rotation of said support about said vertical axis in relation to rotor rotation for a predetermined period of time, whereby said detected relative rotation is a function of the force of gravity.

7. An integrating gravimeter for measuring the acceleration of gravity comprising a proof mass, means for supporting said mass pivotally about a first axis and for constraining said mass against movements other than those about said first axis; said proof mass having its center of mass eccentrically disposed from said first axis; pickoff means for producing an output signal in accordance with the angular position of said mass about said first axis relative to said supporting means; said proof mass comprising a gyro rotor and means for rotatably supporting said rotor about a second axis normal to said first axis; means for rotatably driving said rotor about said second axis; bearing means for rotatably supporting said support means for said proof mass about a third axis normal to said first and second axes; said third axis being substantially vertical; servo means responsive to said pickoff means for torquing said proof mass support about said third axis; and means for measuring rotation of said proof mass support means about said third axis as related to the rotation of said rotor about said second axis during a predetermined time interval.

8. A gravimeter comprising an unbalanced proof mass; gimbal means for supporting said proof mass rotatably about a first axis; said proof mass including a rotor, means for supporting said rotor rotatably about a second axis normal to said first axis and motor means for rotatably driving said rotor; means for supporting said gimbal means rotatably about a third axis normal to said first and second axes; said third axis being substantially vertical; pickoff means for sensing displacement of said proof mass relative to said gimbal means about said first axis; servo means responsive to said pickoff means for applying a torque to said gimbal means about said third axis; and means for measuring the rotation of said gimbal means about said third axis as related to the rotation of said rotor about said second axis over a predetermined time period whereby said detected rotation is a function of the force of gravity.

9. A gravimeter comprising a pendulous gyro; means for pivotally supporting said gyro about a first horizontal axis; said gyro being unbalanced about said axis, said gyro including a rotor, means for rotatably supporting said rotor about a second horizontal axis normal to said first horizontal axis, and means for rotatably driving said rotor about said second horizontal axis; means for mounting said gyro for rotation about a vertical axis, pickoff means for sensing angular deflection of said gyro about said first horizontal axis, servo means responsive to said pickoff means for rotating said gyro about said vertical axis to null the sensed deflections, and means for measuring rotation of said gyro about said vertical axis as related to rotation of said rotor about said second horizontal axis during a predetermined time interval.

References Cited in the file of this patent

UNITED STATES PATENTS

| 2,319,940 | Marrison | May 25, 1943 |
| 2,732,717 | Rothacker | Jan. 31, 1956 |
| 2,907,211 | Breazeale et al. | Oct. 6, 1959 |

FOREIGN PATENTS

| 335,331 | Australia | Aug. 4, 1932 |

UNITED STATES PATENT OFFICE
CERTIFICATE OF CORRECTION

Patent No. 3,073,165                 January 15, 1963

John M. Slater et al.

It is hereby certified that error appears in the above numbered patent requiring correction and that the said Letters Patent should read as corrected below.

Column 3, line 37, after "invention" insert -- will become apparent from the following description taken in connection --; column 7, lines 46 and 47, the formula should appear as shown below instead of as in the patent:

$$W_g = \frac{L}{H} = 0.1 \text{ rad. per sec.} = 0.1/2\pi \text{ r.p.s.}$$

Signed and sealed this 19th day of November 1963.

(SEAL)
Attest:

ERNEST W. SWIDER

Attesting Officer

EDWIN L. REYNOLDS

Acting Commissioner of Patents